Patented Nov. 6, 1951

2,573,701

UNITED STATES PATENT OFFICE 2,573,701

POLYETHYLENE GLYCOL ESTERS OF ACYLOXYCARBOXYLIC ACIDS

Edward M. Filachione, Philadelphia, Pa., Martin L. Fein, Riverside, N. J., and Charles H. Fisher, Abington, Pa., assignors to the United States of America as represented by the Secretary of Agriculture No Drawing. Application June 18, 1948, Serial No. 33,836

4 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation in part of our co-pending application, Serial No. 770,179, filed August 22, 1947, now Patent No. 2,534,255, the disclosure of which is incorporated herein by reference.

This invention relates to polyethylene glycol esters of acylated hydroxycarboxylic acids and has among its objects the provision of such esters and processes for their preparation. Other objects and advantages of the invention will be apparent from the description of the invention.

We have found that polyethylene glycol esters of acyloxycarboxylic acids, which possess valuable properties as solvents, plasticizers and modifying agents for plastic compositions, can be prepared by reacting a polyethylene glycol, or a polyethylene glycol ester containing at least one unsubstituted hydroxyl group, with an ester of a hydroxycarboxylic acid, and treating the resulting glycol ester, thus formed by alcoholysis, with an acylating agent.

According to our invention, the polyethylene glycol, or polyethylene glycol ester containing at least one unsubstituted hydroxyl group, is subjected to alcoholysis (ester interchange) by heating at reaction temperature with an alkyl ester of a hydroxycarboxylic acid, preferably in the presence of a reaction catalyst and with concurrent removal from the reaction mixture of the alkanol formed in the alcoholysis process. The products thus obtained are then acylated by interaction with an organic acylating agent to form polyethylene glycol esters corresponding to the general formula

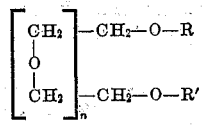

wherein $n$ is an integer from 1 to 3, and at least one of the substituents R and R' is the acyl radical of an aliphatic alpha-acyloxymonocarboxylic acid, and R' may be a member of the group consisting of acyl radicals of saturated aliphatic monocarboxylic acids containing from 5 to 18 carbon atoms and

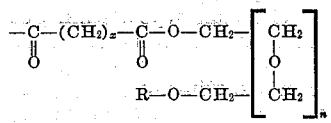

wherein $x$ is an integer and R and $n$ have the same significance as above.

The process of the present invention is applicable to polyethylene glycols corresponding to the general formula

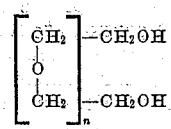

wherein $n$ is an integer from 1 to 3, and to the esters of these glycols which contain at least one unsubstituted hydroxyl group. Suitable esters include, for example, the monoesters of the above defined glycols with saturated aliphatic monocarboxylic acids containing from 5 to 18 carbon atoms like caproic, caprylic, lauric, palmitic or stearic acid; or hydroxycarboxylic acids like glycolic or lactic acid; and diesters of saturated aliphatic dicarboxylic acids like succinic, adipic, sebacic, azelaic acid and the like.

Esters of hydroxycarboxylic acids adapted for use in the alcoholysis process are the lower alkyl esters, such as methyl, ethyl or propyl esters of the lower, saturated, aliphatic, alpha-hydroxy monocarboxylic acids, like glycolic, lactic and alpha-hydroxyisobutyric acid.

Suitable alcoholysis catalysts include acidic substances such as sulfuric acid or toluene sulfonic acid, as well as other esterification catalysts, such as metal alcoholates like aluminum ethoxide or propoxide.

The products of the alcoholysis reaction are acylated in a conventional manner by treatment with an organic acylating agent. Suitable acylating agents include ketene, anhydrides and halides of carboxylic acids like acetic anhydride, propionic anhydride, acetoxypropionyl chloride, pelargonyl chloride and the like.

Since in the alcoholysis process the alkyl esters of hydroxycarboxylic acids are capable of reacting not only with the alcohol groups of the glycol radicals but also with other hydroxyl groups of the reactants and reaction products, the process usually yields products comprising a number of components. The composition of the products obtained and the molecular weight of the predominant constituents can be controlled within certain limits by varying proportions of the reactants, the duration of the alcoholysis process and the amount of alkylol removed from the reaction mixture.

The following Examples I through VIII are illustrative of the preparation of the glycol esters of the invention:

EXAMPLE I

*Preparation of diethylene glycol glycolyl glycolate propionate having the formula*

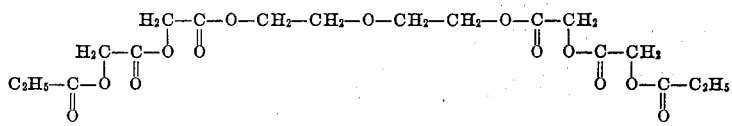

A mixture of 53 g. (0.5 mole) diethylene glycol, 270 g. (3 moles) methyl glycolate, and 0.5 g. p-toluenesulfonic acid monohydrate catalyst, was heated at atmospheric pressure in a flask fitted with a 2-foot Vigreaux-type distilling column. 77 g. of methanol were distilled from the reaction mixture over a period of about 5 hours while the temperature in the still-pot was gradually raised from 118° to 170° C. Excess methyl glycolate was then removed by maintaining the contents of the flask at about 100° C. under a vacuum of 2–3 mm. of mercury until distillation ceased. The distillation residue, consisting essentially of diethylene glycol glycolyl glycolate, was treated with approximately 2.2 moles propionic anhydride, which was added in small portions to maintain the temperature of the reaction below 80° C. On completion of the acylation, propionic acid and excess propionic anhydride were removed by distillation under reduced pressure.

The residual material was dissolved in ether, and the ether solution washed substantially acid free first with dilute sodium chloride solution, then with an aqueous solution of sodium chloride and sodium bicarbonate, and finally with water containing a small amount of sodium chloride to inhibit formation of emulsions. The neutral ether solution was dried with anhydrous calcium sulfate and distilled under reduced pressure to remove the solvent and low-boiling constituents. The light straw-colored distillation residue, consisting essentially of diethylene glycol di-ester of propionyl glycolylglycolic acid (diethylene glycol glycolyl glycolate propionate) had an index of refraction ($N_D^{20}$) of 1.4462 and an ester equivalent of 76.45.

EXAMPLE II

*Preparation of diethyene glycol polylactate propionate*

The intermediate dipolylactate was prepared by heating, at atmospheric pressure, a mixture of 106 g. (1 mole) diethylene glycol, 625 g. (6 moles) methyl lactate and 2 g. p-toluene sulfonic acid (catalyst), and distilling methanol slowly as it was formed in the ester interchange reaction. The total heating time was approximately 12 hours during which 135 cc. methanol was collected, 111 cc. being collected during the first 7 hours. After the reaction mixture had cooled to nearly room temperature, the flask was again heated under good vacuum to distill the excess methyl lactate and any other low-boiling materials.

The distillation residue consisting essentially of polylactate of diethylene glycol, had an index of refraction ($N_D^{20}$) of 1.4525 and ester equivalent of 103.0. Theoretical ester equivalents are:

Diethylene glycol monolactate=178.18
Diethylene glycol dilactate=125.12
Diethylene glycol dilactyllactate=98.5
Diethylene glycol lactate lactyllactate=107.44

The product, isolated as described in Example I above, was treated with 390 g. (3 moles) of propionic anhydride containing several drops of concentrated sulfuric acid as a catalyst. The anhydride was added in small portions and the reaction started after a short induction period when about one-third of the anhydride was added. When the flask temperature began to drop, the flask was warmed for about ½ hour on a steam bath to assure completion of the reaction. Propionic acid and any other low-boiling products present were distilled under vacuum. Residual acidic components were washed out with dilute sodium bicarbonate solution and water. The product separated readily during the washing operation.

The final product, dried over anhydrous CaSO$_4$ and filtered, was clear and pale straw-colored and had a refractive index ($N_D^{20}$) of 1.4397. It consisted predominantly of diethylene glycol lactyllactate propionate having the formula:

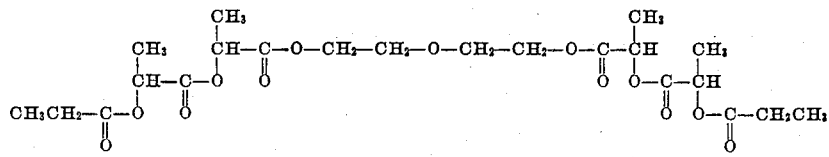

The yield was approximately theoretical when based on a lactate averaging a molecular weight of 412.

EXAMPLE III

*Preparation of diethylene glycol sebacate lactyl lactate acetate and propionate*

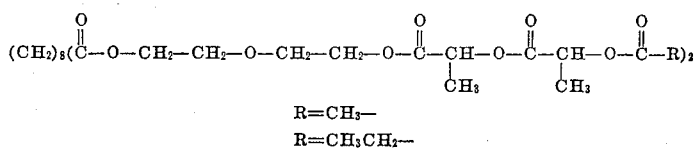

R=CH$_3$—
R=CH$_3$CH$_2$—

Diethylene glycol sebacate was prepared by reacting 202 g. (1 mole) sebacic acid with 265 g. (2.5 moles) diethylene glycol using 1 ml. of concentrated sulfuric acid as the catalyst and 300 cc. benzene as the entraining agent. When the esterification reaction was completed, the entraining agent was removed by distillation and 624 g. (6 moles) methyl lactate added. The ester-interchange reaction was carried out by distilling about 4 moles methanol from the reaction mixture. Excess methyl lactate was distilled under reduced pressure, and the distillation residue, consisting essentially of diethylene glycol sebacate polylactate was divided into two equal portions, and acylated with acetic anhydride and propionic anhydride respectively, using 1.1 molar equivalent of anhydride. After distillation of the acid formed during acylation and treatment with decolorizing carbon, the acylated product was washed acid-free.

$$CH_3CH_2-\overset{O}{\underset{\|}{C}}-O-\underset{\underset{CH_3}{|}}{CH}-\overset{O}{\underset{\|}{C}}-O-CH_2-CH_2-O-CH_2-CH_2-O-CH_2-CH_2-O-CH_2-CH_2-O-\overset{O}{\underset{\|}{C}}-\underset{\underset{CH_3}{|}}{CH}-O-\overset{O}{\underset{\|}{C}}-CH_2CH_3$$

The products thus obtained had the following characteristics:

Diethylene glycol sebacate lactyl lactate acetate $N_D^{20} = 1.4480$
$d_4^{20} = 1.1441$
Ester equivalent = 92.1

Diethylene glycol sebacate lactyl lactate propionate $N_D^{20} = 1.4508$
$d_4^{20} = 1.1287$
Ester equivalent = 100.3

EXAMPLE IV

*Preparation of tetraethylene glycol dilactate diacetate*

$$CH_3-\overset{O}{\underset{\|}{C}}-O-\underset{\underset{CH_3}{|}}{CH}-\overset{O}{\underset{\|}{C}}-O-CH_2-CH_2-O-CH_2-CH_2-O-CH_2-CH_2-O-CH_2-CH_2-O-\overset{O}{\underset{\|}{C}}-\underset{\underset{CH_3}{|}}{CH}-O-\overset{O}{\underset{\|}{C}}-CH_3$$

A mixture of 200 g. (1 mole) tetraethylene glycol, 416 g. (4 mole) methyl lactate and 1 g. p-toluene sulfonic acid was heated to distill 95 cc. of methanol over a period of about 5 hours while the temperature of the reaction mixture was gradually raised from 125° to 165° C. The catalyst was then neutralized with powdered calcium carbonate, and excess methyl lactate was distilled from the reaction mixture under reduced pressure. The filtered distillation residue, consisting essentially of tetraethylene glycol dilactate, was a pale straw-colored, water soluble substance having a refractive index ($N_D^{20}$) of 1.4573. This product was acylated in the usual manner by addition of a slight excess of acetic anhydride containing a few drops of concentrated sulfuric acid. The acid catalyst was then neutralized with calcium carbonate, and the reaction mixture was distilled under reduced pressure to remove acetic acid, acetic anhydride and a small amount of low-boiling by-products.

The distillation residue, consisting essentially of tetraethylene glycol dilactate diacetate (tetraethylene glycol di-alpha-acetoxypropionate), had a refractive index ($N_D^{20}$) of 1.4460. The yield was 385 g.

EXAMPLE V

*Preparation of tetraethylene glycol dilactate dipropionate*

$$CH_3CH_2-\overset{O}{\underset{\|}{C}}-O-\underset{\underset{CH_3}{|}}{CH}-\overset{O}{\underset{\|}{C}}-O-CH_2-CH_2-O-CH_2-CH_2-O-CH_2-CH_2-O-CH_2-CH_2-O-\overset{O}{\underset{\|}{C}}-\underset{\underset{CH_3}{|}}{CH}-O-\overset{O}{\underset{\|}{C}}-CH_2CH_3$$

was prepared by the procedure described in the foregoing example, using propionic anhydride as the acylating agent.

The final product, after washing with dilute aqueous sodium bicarbonate and water to remove residual acidity, had a refractive index ($N_D^{20}$) of 1.4470. The yield was 390 g.

EXAMPLE VI

*Preparation of diethylene glycol monolaurate polylactate pelargonate*

$$CH_3-(CH_2)_7-\overset{O}{\underset{\|}{C}}-O-\underset{\underset{CH_3}{|}}{CH}-\overset{O}{\underset{\|}{C}}-O-\underset{\underset{CH_3}{|}}{CH}-\overset{O}{\underset{\|}{C}}-O-CH_2-CH_2-O-CH_2-CH_2-O-\overset{O}{\underset{\|}{C}}-(CH_2)_{10}-CH_3$$

Diethylene glycol monolaurate polylactate was prepared by ester interchange reaction using 288 g. (1 mole) diethylene glycol monolaurate, 416 g. (4 mole) methyl lactate and 1 g. p-toluene sulfonic acid (catalyst). After distilling the methanol formed during the reaction, excess methyl lactate was removed under reduced pressure as described in the foregoing examples.

0.5 mole diethylene glycol monolaurate polylactate was treated with 0.5 mole pelargonyl chloride in the presence of 200 cc. ethyl ether and 120 g. (1.5 mole) of pyridine. The acylation was conducted below 15° C. with constant stirring. On completion of the reaction, the pyridine hydrochloride precipitate was dissolved by addition of water and the aqueous solution separated from the oily layer consisting essentially of diethylene glycol monolaurate polylactate pelargonate. The product so obtained was washed acid-free with aqueous sodium chloride solution and had a refractive index ($N_D^{20}$) of 1.4449.

EXAMPLE VII

*Preparation of diethylene glycol dilactate 2-ethylhexoate*

$$H(CH_2)_4-\underset{\underset{C_2H_5}{|}}{CH}-\overset{O}{\underset{\|}{C}}-O-\underset{\underset{CH_3}{|}}{CH}-\overset{O}{\underset{\|}{C}}-O-CH_2-CH_2-O-CH_2-CH_2-O-\overset{O}{\underset{\|}{C}}-\underset{\underset{CH_3}{|}}{CH}-O-\overset{O}{\underset{\|}{C}}-\underset{\underset{C_2H_5}{|}}{CH}-(CH_2)_4H$$

A mixture of 2 moles (212 g.) diethylene glycol, 8 moles methyl lactate (832 g.) and 4 g. p-toluenesulfonic acid (catalyst), was heated at atmospheric pressure in a flask fitted with a 2-foot Vigreaux-type distilling column. 164 ml. methanol was distilled from the reaction mixture over a period of about 5 hours, while the temperature in the flask was gradually raised from 113° C. to 145° C. After allowing the flask to cool, the excess methyl lactate was distilled under reduced pressure and the distillation residue was essentially diethylene glycol dilactate. An 0.5 mole equivalent of this product was treated with 180 g. (1 mole and approximately 10% excess) 2-ethylhexoyl chloride by adding the chloride slowly to a cooled solution of the lactate in pyridine (1 mole + 10%) and 200 ml. ether.

When the reaction was completed, the pyridine hydrochloride was dissolved by adding 100 ml. water. The oil layer was separated and washed successively twice with very dilute HCl and six times with water. Benzene (200 ml.) was added to the oil layer separated from the washing operation. The mixture was then set up for distillation, the distillates in order being: ether, benzene-water azeotrope and benzene. Residual benzene was distilled by heating the flask under reduced pressure.

The residue, diethylene glycol dilactate 2-ethylhexoate, was light in color, and had a refractive index ($N_D^{20}$) of 1.4440.

EXAMPLE VIII

*Preparation of triethylene glycol lactyl lactate propionate and pelargonate*

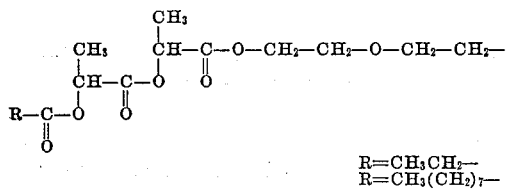

R=CH$_3$CH$_2$—
R=CH$_3$(CH$_2$)$_7$—

A mixture of 1 mole (150 g.) triethylene glycol, 6 moles (624 g.) methyl lactate and 1 g. of p-toluenesulfonic acid monohydrate catalyst, was heated at atmospheric pressure in a flask fitted with a 2-foot Vigreaux-type distilling column. 162 ml. methanol was distilled from the reaction mixture over a period of about 7 hours while the temperature in the flask rose from 124° C. to 175° C. After allowing the flask to cool, the excess methyl lactate was distilled under reduced pressure. The distillation residue, essentially triethylene glycol lactyl lactate, was divided into two equal portions, each approximately equivalent to one-half mole.

One portion was treated with an equivalent amount of propionic anhydride as described in other examples and the final product, triethylene glycol lactyl lactate propionate, was light in color, $N_D^{20}$=1.4439.

The other portion of triethylene glycol lactyl lactate was treated with an equivalent amount of pelargonyl chloride using a procedure similar to that described for acylation with acid chlorides in other examples. The final product, triethylene glycol lactyl lactate pelargonate, was light in color. $N_D^{20}$=1.4462.

EXAMPLE IX

*Preparation of diethylene glycol adipate lactate propionate*

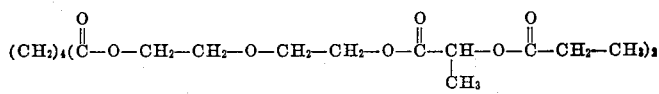

Diethylene glycol adipate was prepared by reacting 292 g. (2 moles) adipic acid with 424 g. (4 moles) diethylene glycol using 1 ml. of concentrated sulfuric acid as the catalyst and 300 cc. benzene as the entraining agent. When the esterification reaction was completed (approximately 4 hours), the entraining agent was removed by distillation. One mole of diethylene glycol adipate (half the material prepared above) was then reacted with 5 moles methyl lactate, with 1 gram p-toluenesulfonic acid (monohydrate) as catalyst. This ester-interchange reaction yielded approximately 2 moles methanol in one and one-half hours. The excess methyl lactate was distilled under reduced pressure, and the residue, consisting essentially of diethylene glycol adipate lactate was then treated with propionic anhydride, using about a 1.05 equivalent of anhydride to acylate all hydroxyl groups. After distillation of the acid formed in the acylation, the product was dissolved in ether and washed acid-free with NaCl and NaHCO$_3$ solutions. The ether layer was then dried and the ether distilled. The final product, diethylene glycol adipate lactate propionate had the following characteristics: $N_D^{20}$=1.4518; ester equivalent=94.0.

In the foregoing examples methyl glycolate and methyl lactate can be replaced by equivalent amounts of other lower alkyl esters of alpha-hydroxymonocarboxylic acids, for instance, ethyl glycolate and ethyl lactate, respectively. Similar products are also obtained by analogous methods using lower alkyl esters of glycolic acid in place of alkyl lactate and other acylating agents, like the halides or anhydrides of carboxylic acids.

The following examples illustrate the use of the compounds of the invention with synthetic plastics, such as organic cellulose esters, cellulose ethers, and polyvinyl compounds, in the production of plastic compositions.

EXAMPLE X 35 g. of vinylchloride-acetate copolymer containing approximately 95% polyvinyl chloride and 5% polyvinyl acetate and 15 g. diethylene glycol dilactate 2-ethylhexoate of Example VII were blended on a mill. The milled sheet was molded at 300° F. and 12 T total pressure (about 640 p. s. i.) for 2 minutes, removed from the mold and conditioned 64 hours at 77° F. and 50% R. H. The resulting product was a tough, flexible sheet.

A similar product was obtained using triethylene glycol lactyl lactate pelargonate of Example VIII as the plasticizing agent.

EXAMPLE XI

*Plasticized compositions.*—Each of the plasticizers listed in the table below was compatible with ethyl and/or cellulose acetate as indicated in the table below. A plasticizer was considered compatible if the final film was clear, dry and flexible.

*Cellulose acetate compatibility.*—The general procedure to obtain a film containing approximately 25% plasticizer by weight was as follows: 0.33 g. of plasticizer was weighed into a small glass-stoppered bottle. 20.6 cc. of a standard acetone solution of cellulose acetate was added to the bottle and the contents mixed well. (20.6 cc. acetone solution contained 1 g. cellulose acetate.) The mixture was poured out on a clean glass plate (6" x 8") to form a film. The plate was placed into a box for slow evaporation of the solvent. When the film appeared to be dry, the plate was placed in an oven at 65° C. for about 4 hours to insure evaporation of the solvent. When cool, the film was removed from the glass plate and examined for compatibility.

*Ethyl cellulose compatibility.*—The general procedure to obtain a film containing approximately 25% plasticizer by weight was as follows: 0.33 g. of plasticizer was weighed into a small glass-stoppered bottle. 15.5 cc. of a standard solution of ethyl cellulose was added to the bottle and the contents mixed well. (15.5 cc. solution contained 1 g. ethyl cellulose.) The mixture was poured out on a 6″ x 8″ glass plate and treated as described above.

| Compound | Compatibility with— | |
|---|---|---|
| | Ethyl Cellulose | Cellulose Acetate |
| Tetraethylene glycol dilactate dipropionate | + | + |
| Tetraethylene glycol dilactate diacetate | + | + |
| Triethylene glycol lactyl lactate propionate | + | + |
| Triethylene glycol lactyl lactate pelargonate | + | ± |
| Diethylene glycol polylactate propionate | + | + |
| Diethylene glycol polylactate pelargonate | + | − |
| Diethylene glycol dilactate 2-ethylhexoate | + | + |
| Diethylene glycol glycolyl glycolate propionate | − | + |
| Triethylene glycol monolaurate polylactate pelargonate | + | − |
| Diethylene glycol sebacate lactyl lactate acetate | + | + |
| Diethylene glycol sebacate lactyl lactate propionate | + | + |
| Diethylene glycol adipate lactate propionate | + | + |

+=compatible.  −=incompatible.  ±=borderline compatibility

Having described our invention we claim:

1. A polyethylene glycol ester corresponding to the formula

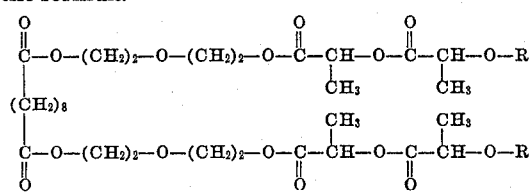

wherein R is the acyl radical of a saturated aliphatic monocarboxylic acid containing from 2 to 3 carbon atoms.

2. The ester of claim 1 wherein R is propionyl.

3. A process comprising subjecting a compound selected from the group consisting of diethylene, triethylene and tetraethylene glycols and saturated esters of said glycols containing at least one free hydroxyl group, to alcoholysis by heating it at reaction temperature with a lower alkyl ester of a lower, aliphatic alpha-hydroxymonocarboxylic acid with concurrent removal of the alcohol formed from the reaction mixture and then reacting the resulting glycol ester with an acylating agent.

4. A process comprising subjecting diethylene glycol sebacate to alcoholysis by heating it at reaction temperature with methyl lactate with concurrent removal of the alcohol formed from the reaction mixture, and then reacting the resulting glycol ester, which consists essentially of diethylene glycol sebacate lactyl lactate, with propionic anhydride as an acylating agent to produce diethylene glycol sebacate lactyl lactate propionate.

EDWARD M. FILACHIONE.
MARTIN L. FEIN.
CHARLES H. FISHER.

REFERENCES CITED

The following references are of record in the file of this patent:

UNITED STATES PATENTS

| Number | Name | Date |
|---|---|---|
| 2,072,102 | Dreyfus | Mar. 2, 1937 |
| 2,106,703 | Cox et al. | Feb. 1, 1938 |
| 2,151,185 | Carruthers | Mar. 21, 1939 |
| 2,158,107 | Carruthers | May 16, 1939 |
| 2,196,758 | Dickey et al. | Apr. 9, 1940 |
| 2,231,729 | Meyer | Feb. 11, 1941 |
| 2,290,128 | Loder | July 14, 1942 |
| 2,359,750 | Collins | Oct. 10, 1944 |
| 2,388,164 | Loder | Oct. 30, 1945 |

FOREIGN PATENTS

| Number | Country | Date |
|---|---|---|
| 445,223 | Great Britain | Apr. 6, 1936 |
| 505,651 | Great Britain | May 8, 1939 |